United States Patent
Dalmatov et al.

(10) Patent No.: US 10,733,051 B2
(45) Date of Patent: Aug. 4, 2020

(54) REDISTRIBUTING DATA ACROSS DRIVES OF A STORAGE ARRAY BASED ON DRIVE HEALTH METRICS

(71) Applicant: EMC IP Holding Company LLC, Hopkinton, MA (US)

(72) Inventors: Nickolay Alexandrovich Dalmatov, Saint Petersburg (RU); Alexander Shraifel, Maalot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/176,897

(22) Filed: Oct. 31, 2018

(65) Prior Publication Data

US 2020/0133772 A1     Apr. 30, 2020

(51) Int. Cl.
*G06F 3/06* (2006.01)
*G06F 11/10* (2006.01)
*G06F 11/20* (2006.01)
*G06F 11/00* (2006.01)

(52) U.S. Cl.
CPC .......... *G06F 11/1076* (2013.01); *G06F 3/064* (2013.01); *G06F 3/0617* (2013.01); *G06F 3/0619* (2013.01); *G06F 3/0649* (2013.01); *G06F 3/0653* (2013.01); *G06F 3/0689* (2013.01); *G06F 11/008* (2013.01); *G06F 11/2094* (2013.01)

(58) Field of Classification Search
CPC ........ G06F 12/00; G06F 11/1076; G06F 3/06; G06F 13/00
See application file for complete search history.

(56) References Cited

U.S. PATENT DOCUMENTS

| 7,461,101 | B2 * | 12/2008 | Hsu ..................... G06F 11/1474 |
| 8,010,498 | B2 * | 8/2011 | Gounares ................. G06F 9/38 707/665 |
| 9,690,660 | B1 | 6/2017 | Robins et al. |
| 9,720,758 | B2 * | 8/2017 | Jacoby ................. G06F 11/079 |
| 9,766,980 | B1 * | 9/2017 | Anantharaman ... G06F 11/1076 |
| 9,804,939 | B1 | 10/2017 | Bono et al. |

(Continued)

OTHER PUBLICATIONS

Cai, et al., "Flash Correct-and-Refresh: Retention-Aware Error Management for Increased Flash Memory Lifetime," IEEE 30th International Conference on Computer Design (ICCD), 2012, 8 pages, retrieved from <https://ieeexplore.ieee.org/document/6378623>.

(Continued)

*Primary Examiner* — Tuan V Thai
(74) *Attorney, Agent, or Firm* — BainwoodHuang (57) ABSTRACT

Techniques are presented for maintaining data distributed across a plurality of storage drives (drives) in a robust manner. A method includes (a) collecting physical state information from each drive of the plurality of drives, (b) generating a predicted failure probability of each drive based on the collected physical state information from that drive, the predicted failure probability indicating a likelihood that that drive will fail within a predetermined period of time, and (c) rearranging a distribution of data across the plurality of drives to minimize a probability of DU/DL. Systems, apparatuses, and computer program products for performing similar methods are also provided.

12 Claims, 4 Drawing Sheets

(56) References Cited

U.S. PATENT DOCUMENTS

| | | |
|---|---|---|
| 9,921,912 B1 | 3/2018 | Vankamamidi et al. |
| 10,095,585 B1 | 10/2018 | Proulx |
| 10,146,459 B1 | 12/2018 | Gao et al. |
| 2018/0284997 A1 | 10/2018 | Dalmatov |
| 2019/0310781 A1* | 10/2019 | Gross .................... G06F 3/0653 |
| 2019/0370119 A1* | 12/2019 | Danilov .............. G06F 11/1088 |

OTHER PUBLICATIONS

Meza, et al., "A Large-Scale Study of Flash Memory Failures in the Field," SIGMETRICS'15, Jun. 2015, 14 pages, retrieved from <http://dx.doi.org/10.1145/2745844.2745848r>, ACM, Portland, Oregon.

Schroeder, et al., "Flash Reliability in Production: The Expected and the Unexpected," Proceedings of the 14th USENIX Conference on File and Storage Technologies, Feb. 2016, pp. 67-80, retrieved from <https://www.usenix.org/conference/fast16/technical-sessions/presentation/schroeder>, USENIX Association, Santa Clara, California.

Narayanan, et al., "SSD Failures in Datacenters: What? When? and Why?," SYSTOR '16, Jun. 2016, 11 pages, retrieved from <http://dx.doi.org/10.1145/2928275.2928278>, ACM, Haifa, Israel.

Dalmatov, et al., "Proactive Allocation of Non-Volatile Data Storage to Storage Objects in a Data Storage System to Anticipate Storage Object Access Trends," International Patent Application Serial No. PCT/RU2018/000276, filed Apr. 26, 2018, 34 pages.

Armangau, et al., "Optimizing File System Layout for Reduced Raid Processing," U.S. Appl. No. 14/980,928, filed Dec. 28, 2015.

Foley, et al., "Selective Raid Repair Based on Content Mapping," U.S. Appl. No. 15/281,951, filed Sep. 30, 2016.

\* cited by examiner

REDISTRIBUTING DATA ACROSS DRIVES OF A STORAGE ARRAY BASED ON DRIVE HEALTH METRICS

BACKGROUND

A data storage system is an arrangement of hardware and software that typically includes one or more storage processors coupled to an array of non-volatile data storage devices, such as magnetic disk drives, electronic flash drives, and/or optical drives. The storage processors service host input/output (I/O) operations received from host machines. The received I/O operations specify storage objects (e.g. logical disks or "LUNs") that are to be written to, read from, created, or deleted. The storage processors run software that manages incoming I/O operations and that performs various data processing tasks to organize and secure the host data received from the host machines and stored on the non-volatile data storage devices Many conventional data storage appliances use RAID (redundant array of independent disks) technology to store large volumes of data across numerous physical storage drives without requiring user machines to address each individual disk. RAID systems also frequently store data redundantly so data can be recovered if one or more storage drives fail unexpectedly.

Some data storage appliances using RAID technology include spare storage drives which are reserved as "hot spares" in case one or more storage drives fail. In the event of a drive failure, the system can be "rebuilt" by reconstructing data from the failed drive using data from the remaining drives and then writing the recovered data to a spare drive. Once all the recovered data has been written to the spare drive, the system can continue normal operation.

SUMMARY

Unfortunately, conventional data storage appliances using RAID may experience performance limitations. Upon failure of a drive, performing a rebuild of the system requires reading data from the remaining drives and copying the reconstructed data to a spare drive which may have limited write performance. The speed of rebuilding the system will be bottlenecked by the maximum write throughput for writing the reconstructed data to the spare drive. The system is vulnerable to permanent data loss if an additional drive fails before the rebuild process is completed.

The speed of the rebuild process can be improved by using Mapped RAID techniques. In Mapped RAID, the system distributes data across RAID extents which are made up of disk extents. The various RAID extents are provided by various sets of disk extents across the physical storage drives. Instead of reserving one or more entire physical drives as spares, Mapped RAID allocates spare disk extents distributed across a large pool of drives in the data storage appliance. The performance bottleneck associated with rebuilding is reduced when writing the rebuilt data is distributed across multiple drives.

However, it is not uncommon for several drives within a Mapped RAID pool to fail at approximately the same time. This is problematic because if a second drive fails before a first failed drive has been rebuilt, there is high likelihood of data loss (e.g., in a situation in which a single-fault-tolerant scheme is used, such as RAID-5).

In order to overcome these risks, it would be desirable to minimize the likelihood of a second drive failing while a first drive is being rebuilt, in either a Mapped RAID or a traditional RAID system. In contrast with prior approaches, improved techniques keep track of drive health statistics in order to estimate a likelihood that each drive will fail within a defined period of time. The improved techniques further estimate a probability of data unavailability or data loss (DU/DL) based on those likelihoods and a current distribution of data. If the probability is too high and a different distribution would result in a significantly lower probability of DU/DL, then the improved techniques re-arrange the distribution of data in accordance with the different distribution.

In one embodiment, a method of maintaining data distributed across a plurality of storage drives (drives) in a robust manner is provided. The method includes (a) collecting physical state information from each drive of the plurality of drives, (b) generating a predicted failure probability of each drive based on the collected physical state information from that drive, the predicted failure probability indicating a likelihood that that drive will fail within a predetermined period of time, and (c) rearranging a distribution of data across the plurality of drives to minimize a probability of DU/DL. Systems, apparatuses, and computer program products for performing similar methods are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for minimizing the likelihood of a second drive failing while a first drive is being rebuilt and related problems. In contrast with prior approaches, improved techniques keep track of drive health statistics in order to estimate a likelihood that each drive will fail within a defined period of time. The improved techniques further estimate a probability of data unavailability or data loss (DU/DL) based on those likelihoods and a current distribution of data. If the probability is too high and a different distribution would result in a significantly lower probability of DU/DL, then the improved techniques re-arrange the distribution of data in accordance with the different distribution.

Figure 1:
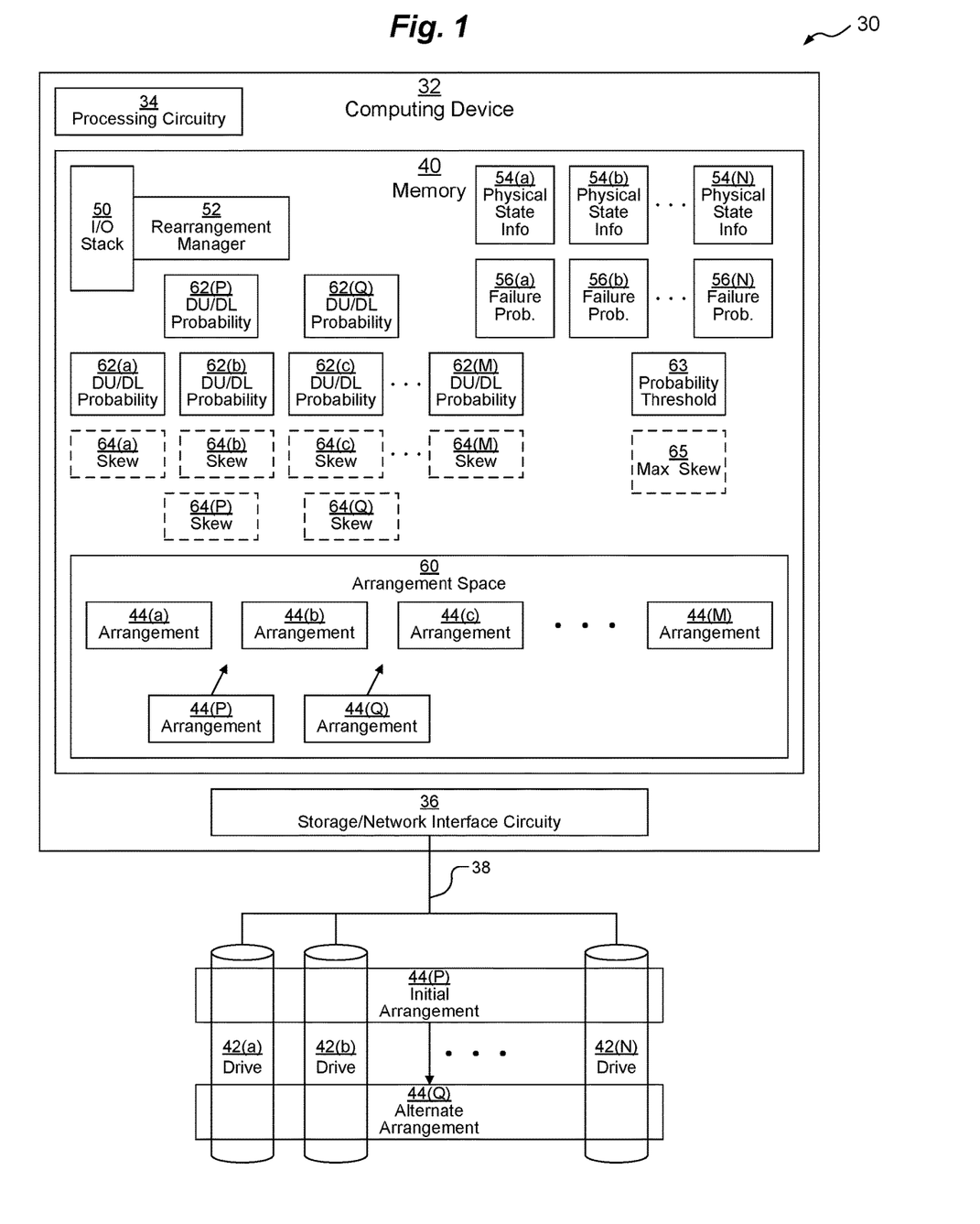
FIG. 1 is a block diagram depicting an example system and apparatuses for use in connection with various embodiments.

FIG. 1 depicts a system 30 including a computing device 32 connected to an array of persistent data storage drives 42

(depicted as drives 42(a), 42(b), ..., 42(N)) via connection 38. In some embodiments, drives 42 may be locally installed within the same chassis as computing device 32, while in other embodiments, drives 42 may be external to or remote from computing device 32.

Computing device 32 may be any kind of computing device, such as, for example, a personal computer, workstation, server computer, enterprise server, data storage system (DSS) rack server, laptop computer, tablet computes, smart phone, mobile computer, etc. Typically, computing device 32 is a DSS rack server. Computing device 32 includes processing circuitry 34, storage interface and/or network interface circuitry 36, and memory 40. Computing device 32 may also include other components as are well-known in the art, including interconnection circuitry.

Processing circuitry 34 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface and/or network interface circuitry 36 provides access and an interface to connection 38 to drives 42 and may control drives 42. Connection 38 may be any kind of connection over which computing device 32 can communicate with drives 42 such as, for example, Ethernet cables, Wireless Fidelity (Wi-Fi) wireless connections, an IP network, SCSI cables, SATA cables, Fibre Channel (FC) cables, etc. If connection 38 is a network connection, then storage interface and/or network interface circuitry 36 may include, for example, one or more Ethernet cards, cellular modems, FC adapters, Wi-Fi wireless networking adapters, and/or other devices for connecting to a network. If connection 38 is a local storage connection, then storage interface and/or network interface circuitry 36 may include for example, SCSI, SAS, ATA, SATA, FC, and/or other similar controllers and ports.

Drives 42 may include any kind of persistent storage devices, such as, for example, hard disk drives, solid-state storage devices, flash drives, etc. Drives 42 are arranged in an array configuration, such as for example a traditional (or "fixed") RAID array or a Mapped RAID array. Data stored on drives 42 is initially distributed across the drives 42 according to an initial arrangement 44(P). After operation of techniques described herein, the data transitions to being distributed across the drives 42 according to an alternative arrangement 44(Q).

Memory 40 may be any kind of digital system memory, such as, for example, random access memory (RAM). Memory 80 stores an operating system (OS, not depicted) in operation (e.g., a Linux, UNIX, Windows, MacOS, or similar operating system). Memory 40 also stores an input/output (I/O) stack 50 in operation. I/O stack 50 allows I/O requests (not depicted) from external hosts (as well as local applications) to be processed with respect to the storage managed by the computing device 32 (e.g., persistently stored data on drives 42 as well as data temporarily cached within memory 40).

Memory 40 also stores rearrangement manager 52 in operation. In some embodiments, rearrangement manager 52 is part of I/O stack 50, and in other embodiments, rearrangement manager 52 operates as an external driver called by I/O stack 50. Rearrangement manager 52 operates to receive physical state information 54 for each drive 42 and to calculate respective failure probabilities 56 based thereon. Thus, for example, as depicted, drive 42(a) sends physical state information 54(a) about itself to computing device 32, allowing rearrangement manager 52 to calculate a likelihood that drive 42(a) will fail within a predetermined period (e.g., within the next hour, within the next 24 hours, etc.), storing that calculated likelihood as failure probability 56(a). Similarly, as depicted, drive 42(b) sends physical state information 54(b) about itself to computing device 32, allowing rearrangement manager 52 to calculate and store failure probability 56(b); and drive 42(N) sends physical state information 54(N) about itself to computing device 32, allowing rearrangement manager 52 to calculate and store failure probability 56(N).

Physical state information 54 may include various values that are relevant in deciding how likely a drive 42 is to fail and how soon. In some embodiments, physical state information 54 includes counts of various types of errors experienced by a drive 42 (e.g., bad flash blocks that have been remapped, failure to complete a write, erasure failures, uncorrectable read errors, correctable read errors, cyclic redundancy check errors, etc.), how many blocks have been erased, available and used capacity, how many spare flash blocks there are, how long the drive 42 has been on, how many total blocks have been read and written, a drive temperature, etc.

Rearrangement manager 52 may calculate the failure probability 56 given the physical state information 54 according to various techniques, such as, for example, based on known techniques for estimating a remaining lifetime of flash storage, as is well-known in the art. As an example, "Flash Reliability in Production: The Expected and the Unexpected" by Bianca Schroeder, Raghev Lagisetty, and Arif Merchant, included in the Proceedings of the 14$^{th}$ USENIX Conference on File and Storage Technologies, <https://www.usenix.org/conference/fast16/technical-sessions/presentation/schroeder>, teaches such techniques, the entire contents and teachings of which are incorporated herein by this reference. As another example, "A Large-Scale Study of Flash Memory Failures in the Field" by Justin Meza, Qiang Wu, Sanjeev Kumar, and Onur Mutlu, included in SIGMETRICS' 15, <http://dx.doi.org/10.1145/2745844.2745848r>, teaches such techniques, the entire contents and teachings of which are incorporated herein by this reference. As another example, "SSD Failures in Datacenters: What? When? and Why?" by Iyswarya Narayanan, Di Wang, Myeongjae Jeon, Bikash Sharma, Laura Caulfield, Anand Sivasubramaniam, Ben Cutler, Jie Liu, Badriddine Khessib, and Kushagra Vaid, included in SYSTOR '16, <http://dx.doi.org/10.1145/2928275.2928278>, teaches such techniques, the entire contents and teachings of which are incorporated herein by this reference. As another example, "Flash Correct-and-Refresh: Retention-Aware Error Management for Increased Flash Memory Lifetime" by Yu Cai, Gulay Yalcin, Onur Mutlu, Erich F. Haratsch, Adrian Cristal, Osman S. Unsal, and Ken Mai, included in the 2012 IEEE 30th International Conference on Computer Design (ICCD), <https://ieeexplore.ieee.org/document/6378623>, teaches such techniques, the entire contents and teachings of which are incorporated herein by this reference.

Rearrangement manager 52 also operates to calculate a DU/DL probability 62(P) for the initial arrangement 44(P) by combining the initial arrangement 44(P) with the failure probabilities 56. Rearrangement manager 52 also operates to search an arrangement space 60 of arrangements 44 (depicted as arrangements 44(a), 44(b), 44(c), ..., 44(M), also including initial arrangement 44(P) and an alternate arrangement 44(Q) therein) for a lowest DU/DL probability 62(Q) associated with an alternate arrangement 44(Q) that is lower than the DU/DL probability 62(P) for the initial arrangement 44(P). This may include calculating a respective DU/DL probability 62 (depicted as DU/DL probability 62(*a*), DU/DL probability 62(*b*), DU/DL probability 62(*c*), . . . , DU/DL probability 62(M)) for each arrangement 44 of the space 60. In some embodiments, rearrangement manager 52 also calculates a respective skew value 64 for each arrangement 44 of the space 60, the skew value 64 being a measure of how unevenly the data is distributed between the various drives 42 in each respective arrangement 44.

Memory 40 also stores a probability threshold 63, which is a measure of a minimum improvement from initial DU/DL probability 62(P) to alternate DU/DL probability 62(Q), sufficient to warrant rearranging the data, Thus, for example, in one embodiment, probability threshold 63 is a value of 15 percentage points.

In some embodiments, memory 40 also stores a maximum skew value 65, which represents a maximum allowed value for skew 64 for any given arrangement 44 to be assigned as the alternate arrangement 44.

This, as depicted, memory 40 stores extent I/O stack 50 and rearrangement manager 52, both of which execute on processing circuitry 34, as well as data used by those applications, as described above.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage drives 42 is configured to store programs and data even while the computing device 32 is powered off. The OS and the applications 50, 52 are typically stored in this persistent storage portion of memory 40 or on persistent storage drives 42 so that they may be loaded into a system portion of memory 40 from this persistent storage portion of memory 40 or persistent storage drives 42 upon a restart. These applications 50, 52 when stored in non-transient form either in the volatile portion of memory 40 or on persistent storage drives 42 or in persistent portion of memory 40, form a computer program product. The processing circuitry 34 running one or more of these applications or drivers 50, 52 thus forms a specialized circuit constructed and arranged to carry out the various processes described herein.

Figure 2:
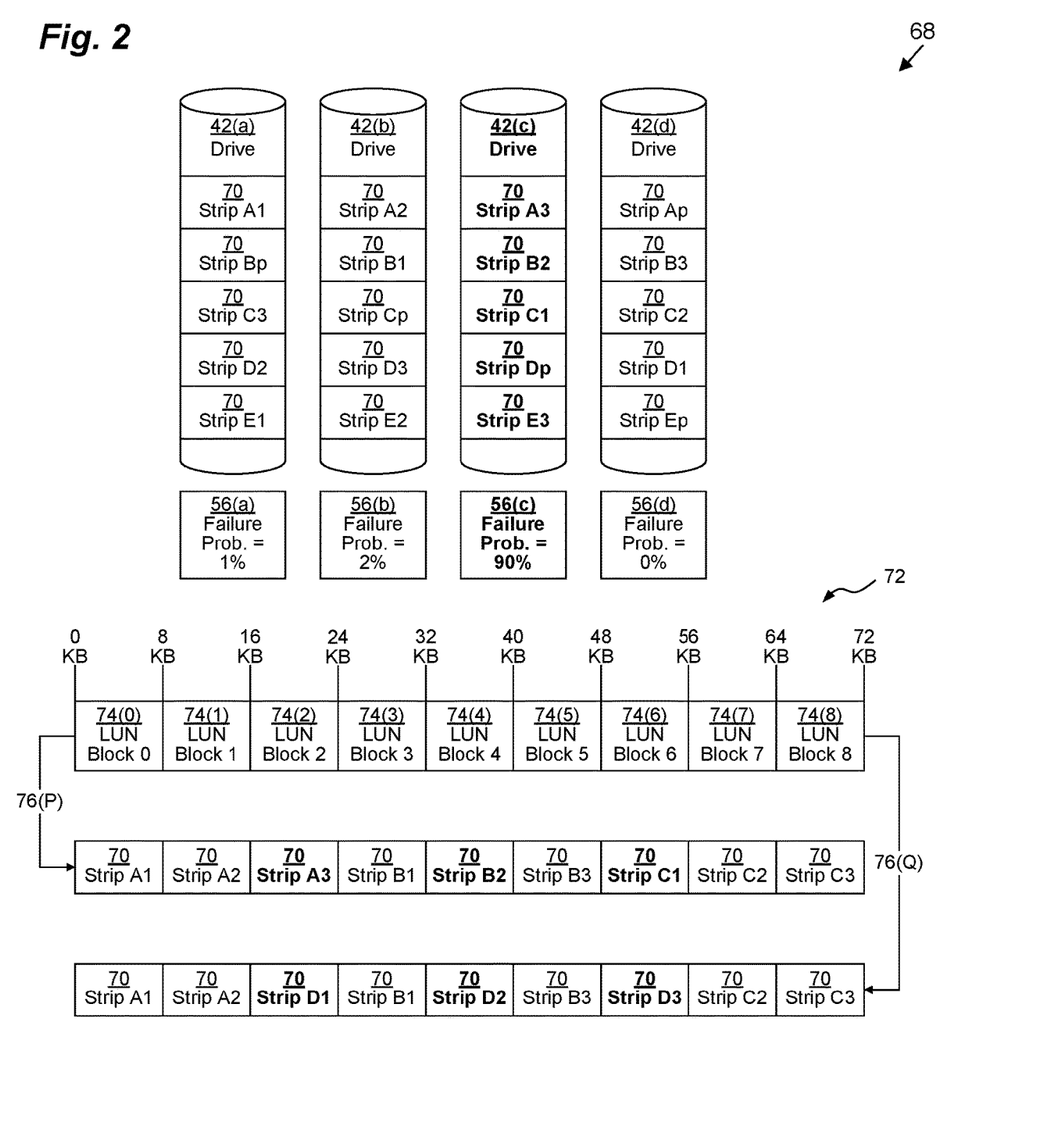
FIG. 2 is a block diagram depicting an example arrangement of data structures for use in connection with various embodiments.

FIG. 2 depicts an example configuration 68 when the drives 42 are set up as a fixed RAID-5 array. As depicted, there are four drives 42(*a*)-42(*d*), and there are five RAID-5 stripes across the array. Stripe A has three data strips 70 (a strip 70, also known as a disk extent, is a contiguous range of addresses on a drive 42 that is a component of a RAID stripe), A1, A2, and A3, as well as one parity strip Ap.

Similarly, Stripe B has three data strips, B1, B2, and B3, as well as one parity strip Bp, but stripe B is rotated so that it is offset from stripe A by a disk. Similarly, Stripe C has three data strips, C1, C2, and C3, as well as one parity strip Cp, but stripe C is rotated so that it is offset from stripe B by a disk and offset from stripe A by 2 disks. Stripe D has three data strips, D1, D2, and D3, as well as one parity strip Dp, but stripe D is rotated so that it is offset from stripe C by a disk and offset from stripe B by 2 disks and from stripe A by 3 disks. Stripe E has three data strips, E1, E2, and E3, as well as one parity strip Ep, but stripe E is rotated so that it is offset from stripe D by a disk and offset from stripe C by 2 disks and from stripe B by 3 disks.

As depicted, drive 42(*a*) has a failure probability 56(*a*) of only 1%. Drive 42(*b*) has a failure probability 56(*b*) of only 2%, and drive 42(*d*) has a failure probability 56(*d*) of 0%. However, drive 42(*c*) has a failure probability 56(*c*) of 90%. Thus, drive 42(*c*) is expected to fail imminently, which would normally result in data unavailability, since even if a hot spare drive is used to replace drive 42(*c*), it will take some time (e.g., several hours) to rebuild the strips A3, B2, C1, Dp, and E3 of that drive onto the hot spare.

Initially, data of a logical disk (referred to as a LUN) is distributed across the RAID strips 70 according to a straightforward initial arrangement 44(P). Initial arrangement 44(P), as depicted, represents a monotonically-increasing contiguous mapping 76(P) from the LUN address space 72 to the strips 70. Thus, LUN block 74(0) (which is an 8-kilobyte block starting at logical address 0 of the LUN's address space 72) is mapped to be stored on strip A1 and LUN block 74(1) (which is an 8-kilobyte block starting at logical address 1 (offset 8 kilobytes from logical address 0) of the LUN's address space 72) is mapped to be stored on strip A2. LUN block 74(2) is mapped to be stored on strip A3, LUN block 74(3) is mapped to be stored on strip B1, LUN block 74(4) is mapped to be stored on strip B2, LUN block 74(5) is mapped to be stored on strip B3, LUN block 74(6) is mapped to be stored on strip C1, LUN block 74(7) is mapped to be stored on strip C2, and LUN block 74(8) is mapped to be stored on strip C3.

However, since drive 42(*c*) is likely to fail soon, rearrangement manager 52 rearranges the mapping 76(P) from the LUN address space 72 to the strips 70 so that data strips A3, B2, and C1 are bypassed in an alternate arrangement 44(Q). Thus, as depicted, in alternate mapping 76(Q), LUN block 74(2) is mapped to be stored on strip D1 instead of A3, LUN block 74(4) is mapped to be stored on strip D2 instead of B2, and LUN block 74(6) is mapped to be stored on strip D3 instead of C1. Thus, once the new alternate mapping 76(Q) is implemented (e.g., by copying data and/or re-directing new writes), even when drive 42(*c*) imminently fails, stripes A, B, and C remain fully available. Even stripe D remains available, but error detection is not available until strip Dp is rebuilt.

Figure 3A:
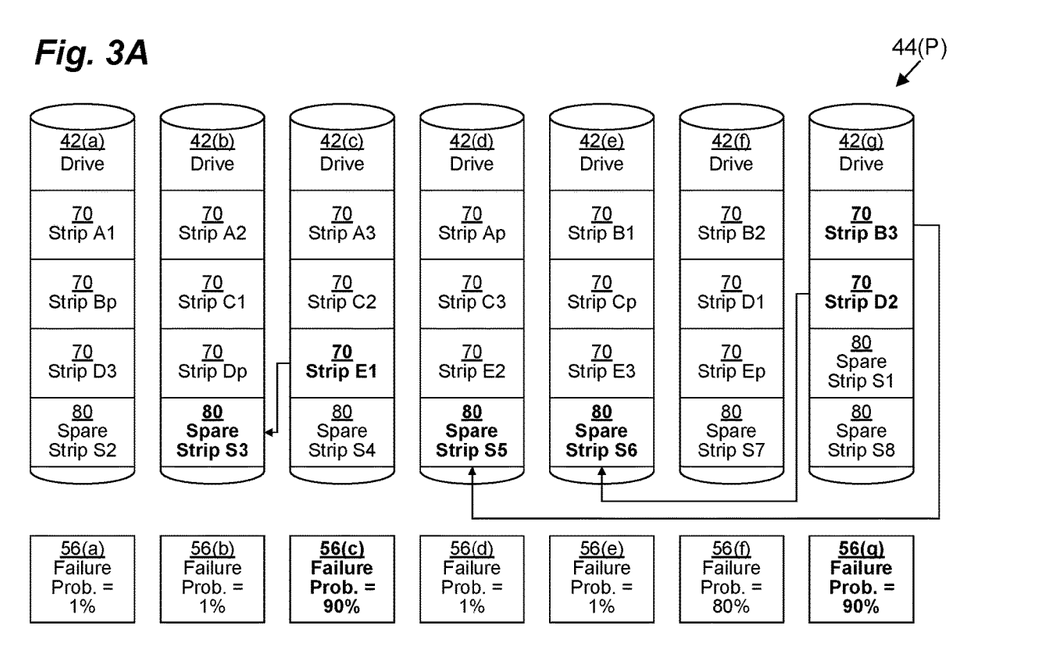
FIGS. 3A and 3B are block diagrams depicting example arrangements of data structures for use in connection with various embodiments.

FIG. 3A depicts an example initial arrangement 44(P) across a Mapped RAID array. As depicted, there are seven drives 42(*a*)-42(*g*), and there are five Mapped RAID-5 stripes across the array. As in FIG. 2, in FIG. 3A stripe A has three data strips A1, A2, and A3, as well as one parity strip Ap, but since this is Mapped RAID rather than traditional RAID, stripe A does not extend across the full width of all seven drives 42 of the array.

As in FIG. 2, in FIG. 3A stripe B has three data strips B1, B2, and B3, as well as one parity strip Bp, but since this is Mapped RAID rather than traditional RAID, stripe B does not extend across the full width of all seven drives 42 of the array, and the drives 42(*e*), 42(*f*), 42(*g*), 42(*a*) of stripe B are different than the drives 42(*a*), 42(*b*), 42(*c*), 42(*d*) of stripe A. Stripes C and D are also both distributed across different subsets of the disks 42 of the array. In addition, there are several spare strips 80 (depicted as spare strips S1-S8), which are available for remapping from other strips 70.

As depicted in FIG. 3A, drives 42(*a*), 42(*b*), 42(*d*), and 42(*e*) each have a failure probability 56(*a*), 56(*b*), 56(*d*), 56(*e*) of only 1%. Drives 42(*c*) and 42(*g*) each have a failure probability 56(*c*), 56(*g*) of 90%, and drive 42(*f*) has a failure probability 56(*f*) of 80%. Thus, drives 42(*c*) and 42(*g*) are both expected to fail imminently, and drive 42(*f*) is also likely to fail almost as soon. This could result in data loss because there is a good chance that two (or even three) of these drives 42(*c*), 42(*f*), 42(*g*) could fail simultaneously or before all the strips 70 of one of the others have been rebuilt.

Fortunately, if both drives 42(*c*) and 42(*g*) fail at once but no other drive 42 fails before they can be rebuilt, there will be data unavailability while the drives 42(*c*), 42(*g*) are rebuilt, but the probability of data loss caused by such a double failure is zero because there are no stripes shared by both drives 42(c), 42(g). However, if drive 42(f) also fails while drives 42(c) and 42(g) are being rebuilt, then stripes B, D, and E may experience data loss since those stripes B, D, E will all have lost two strips.

In some embodiments (not depicted), a LUN remapping scheme as depicted in FIG. 2 could also be used in the Mapped RAID array of FIG. 3A to reduce the chance of DU/DL. However, in other embodiments, features of Mapped RAID are used instead, as depicted in FIG. 3B.

Figure 3B:
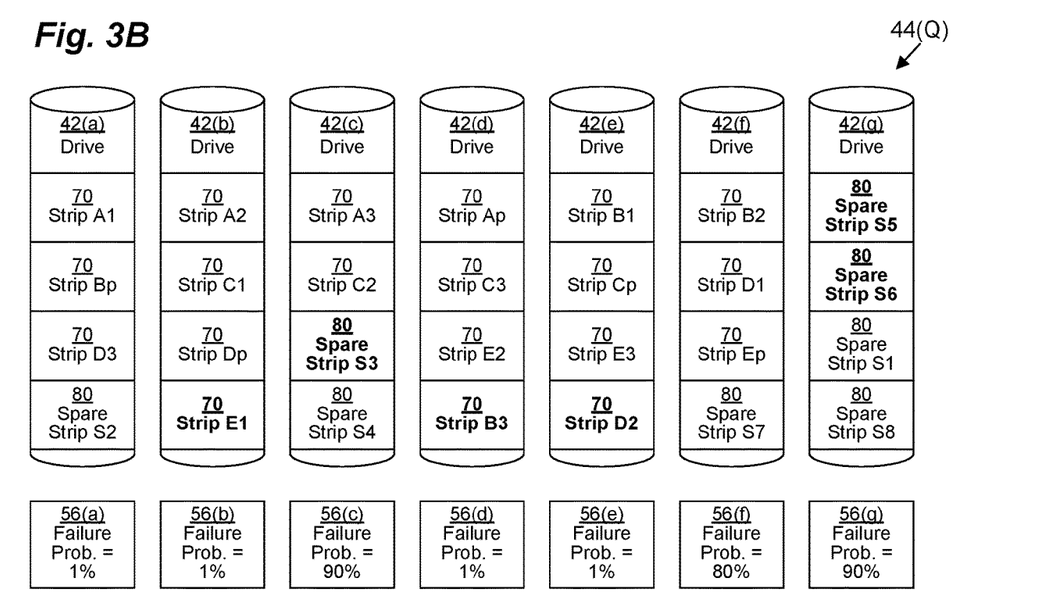

Thus, FIG. 3B depicts an example alternate arrangement 44(Q) across the Mapped RAID array from FIG. 3A. In alternate arrangement 44(Q), in anticipation of the possible failures of drives 42(c), 42(f), 42(g), strip B3 is moved to drive 42(d) and swapped with spare strip S5, strip D2 is moved to drive 42(e) and swapped with spare strip S6, and strip E1 is moved to drive 42(b) and swapped with spare strip S3. Thus, even if all three of drives 42(c), 42(f), 42(g) fail simultaneously, there will be no data loss because no stripe will lose more than one strip 70.

Thus, the alternate arrangement 44(Q) depicted in FIG. 3B has a lower alternate DU/DL probability 62(Q) than the initial DU/DL probability 62(P) of the initial arrangement 44(P) depicted in FIG. 3A.

Figure 4:
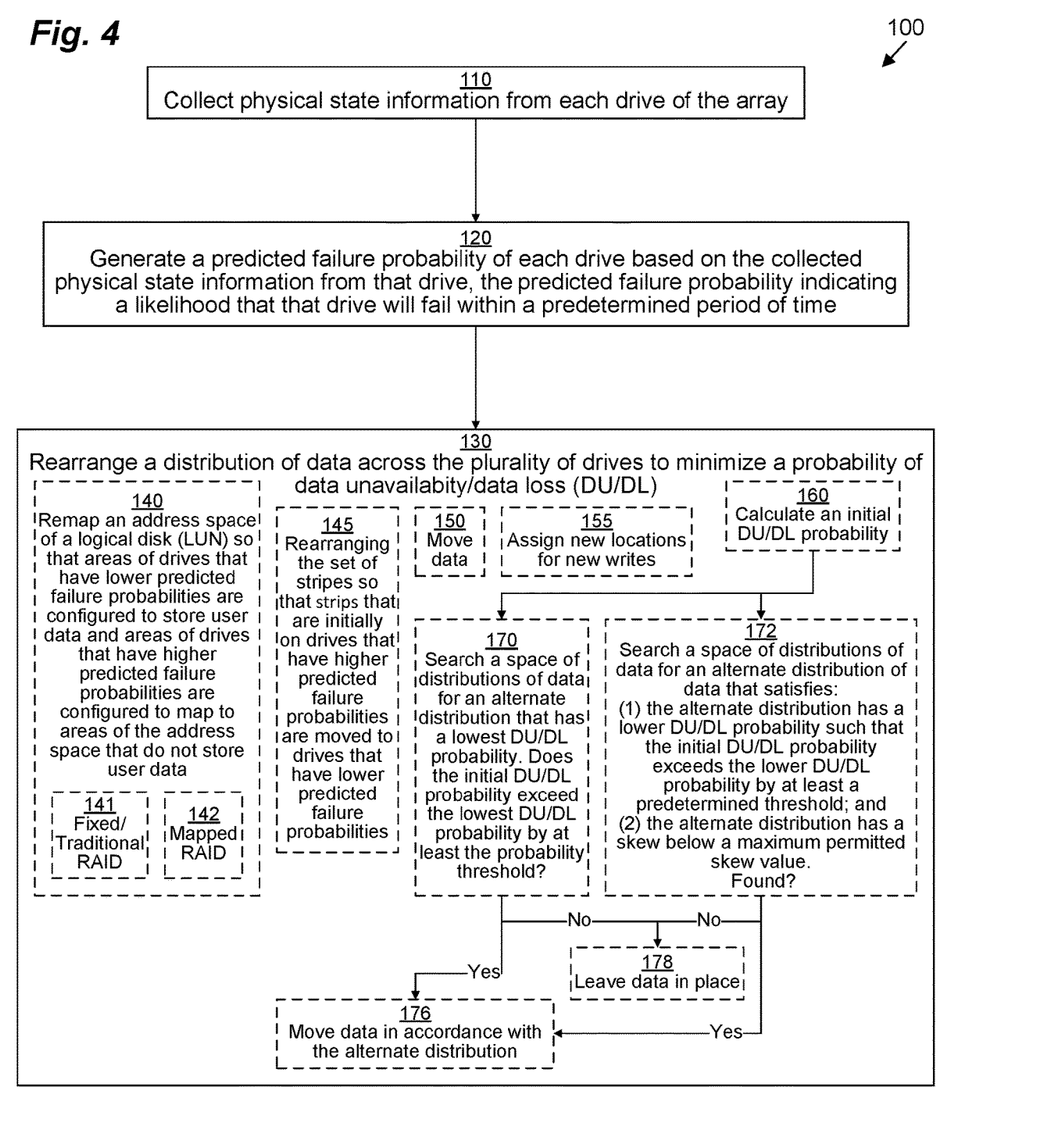
FIG. 4 is a flowchart depicting example methods according to various embodiments.

FIG. 4 illustrates an example method 100 performed by I/O stack 50 and rearrangement manager 52 running on processing circuitry 34 of computing device 32 in conjunction with other applications, storage/network interface circuitry 36, and drives 42 for rearranging data on drives 42 to reduce the probability of DU/DL. It should be understood that any time a piece of software (e.g., I/O stack 50, rearrangement manager 52, OS, etc.) is described as performing a method, process, step, or function, in actuality what is meant is that a computing device (e.g., computing device 32) on which that piece of software is running performs the method, process, step, or function when executing that piece of software on its processing circuitry 34. It should be understood that one or more of the steps or sub-steps of method 100 may be omitted in some embodiments. Similarly, in some embodiments, one or more steps or sub-steps may be combined together or performed in a different order. Sub-steps 140-178 of method 100 marked with dashed lines may be deemed to be either optional or representative of alternative embodiments. Method 100 is performed by computing device 32 in communication with drives 42.

In step 110, rearrangement manager 52 collects and stores physical state information 54 from each drive 42 of the array. Then, in step 120, rearrangement manager 52 generates a predicted failure probability 56 of each drive 42 based on the collected physical state information 54 from that drive 42, the predicted failure probability 56 indicating a likelihood that that drive 42 will fail within a predetermined period of time (e.g., 1 hour, 24 hours, etc.).

Then, in step 130, rearrangement manager 52 rearranges a distribution of data across the plurality of drives 42 to minimize a probability of DU/DL, making especially sure to minimize the chance of permanent data loss, while also trying to reduce temporary data unavailability. Step 130 may include either sub-step 140 or 145. Step 130 may also include either sub-step 150, 155, or both. In some embodiments, step 130 is performed by performing sub-step 160 followed by either sub-step 170 or 172, followed by either sub-step 176 or 178.

In sub-step 140, rearrangement manager 52 remaps an address space 72 of a LUN so that areas of drives 42 that have lower predicted failure probabilities 56 are configured to store user data and areas of drives 42 that have higher predicted failure probabilities 56 are configured to map to areas of the address space 72 that do not store user data. For example, as depicted in FIG. 2, in alternate mapping 76(Q), strips A1, A2, D1, B1, D2, B3, D3, C2, and C3 are mapped to blocks 74(0)-74(8), respectively, each of which stores user data. However, strips A3, B2, and C1 are made to no longer map to blocks 74 that store user data. Although not depicted explicitly, in some embodiments, strips A3, B2, and C1 may become mapped to areas of the address space 72 that are unlikely to store user data, such as, for example, blocks 74 with logical addresses over 1 billion of the LUN's address space 72. Sub-step 140 may either be performed when (indicated by sub-sub-step 141) the array of drives 42 is a traditional or fixed RAID array (e.g., traditional RAID levels 0, 1, 5, 6, 10, etc.) or when (indicated by sub-sub-step 142) the array of drives 42 is a Mapped RAID array in which at least some of the stripes have their strips 70 on different sets of the drives 42.

In sub-step 150, which is only performed in conjunction with embodiments that use Mapped RAID rather than traditional RAID, rearrangement manager 52 rearranges the set of stripes so that strips 70 that are initially on drives 42 that have higher predicted failure probabilities 56 are moved to drives 42 that have lower predicted failure probabilities 56. For example, with reference to FIGS. 3A and 3B, strip D2, which is initially on drive 42(g) with a high failure probability 56(g) of 90%, is moved to drive 42(e) with a low failure probability 56(e) of 1%.

In sub-step 150, rearrangement manager 52 actually moves data from one drive 42 to another. Thus, for example, in the embodiment of FIG. 2, rearrangement manager 52 copies the user data of block 74(2) from strip A3 on drive 42(c) to strip D1 on drive 42(d). As another example, in the embodiment of FIGS. 3A and 3B, rearrangement manager 52 copies the user data of strip B3 from drive 42(g) to drive 42(d).

In sub-step 155, rearrangement manager 52 assigns new locations for data that is not yet stored on drives 42. Thus, for example, in the embodiment of FIG. 2, initially the LUN is relatively empty; only LUN blocks 74(0) and 74(1) contain user data, while LUN blocks 74(2)-74(8) are all empty. Strips A3, B1, B2, B3, C1, C2, and C3 are initially mapped to LUN blocks 74(2)-74(8), but they remain empty. However, in step 130 (and sub-step 155), rearrangement manager 52 reassigns LUN block 74(2) to strip D1 instead of strip A3 so that eventually when a user wants to write user data to LUN block 74(2) it will be stored on strip D1 of drive 42(d) rather than on strip A3 of drive 42(c). As another example, in the embodiment of FIGS. 3A and 3B, initially strips B3, D2, and E1 all happen to be empty. Thus, in step 130 (and sub-step 155), rearrangement manager 52 reassigns strip D2 from drive 42(g) to instead be on drive 42(e). Eventually, when a user wants to write user data to strip D2, it will be written to drive 42(e) instead of being written to drive 42(g).

In sub-step 160, rearrangement manager 52 calculates initial DU/DL probability 62(P). In an example embodiment, consider the example of FIG. 3A. Rearrangement manager 52 assigns the failure probability 56 of each drive 42 to each strip 70 on that drive 42. Then, since Mapped RAID-5 is being used in this example, rearrangement manager 52 calculates a data unavailability probability for each RAID stripe by calculating the probability that exactly one strip 70 of that RAID stripe will fail. For example, for stripe E, this calculation is the probability that exactly one of strips E1 and E2 fails is 90%+((100%−90%)×1%)=90.1%. Then, the probability that exactly one of strips E1, E2, and E3 fails is 90.1%+((100%−90.1%)×1%)=90.199%. Then, the probability that exactly one of strips E1, E2, E3, and E4 fails is 90.199%+((100%−90.199%)×80%)=98.0398%. This can be repeated for each stripe and the unavailability probabilities for each stripe can be combined in a similar manner. In addition, rearrangement manager 52 calculates a data loss probability for each RAID stripe by calculating the probability that at least two strips 70 of that RAID stripe will fail. The data loss probabilities for each stripe can be combined in a similar manner. The data loss and data unavailability probabilities can then be combined (e.g., by averaging, by taking whichever is larger, etc.)

Then, in some embodiments, operation proceeds with sub-step 170. In sub-step 170, rearrangement manager 52 searches a space 60 of arrangements 44 for an alternate arrangement 44(Q) that has a lowest DU/DL probability. This may involve calculating the DU/DL probabilities 62 for each arrangement 44 in the space 60. If the initial DU/DL probability 44(P) exceeds the lowest DU/DL probability 44(Q) by at least the probability threshold 63 (e.g., by more than 10 percentage points), then operation proceeds with sub-step 176. Otherwise operation proceeds with sub-step 178.

Alternatively, in sub-step 172, rearrangement manager 52 searches a space 60 of arrangements 44 for an alternate arrangement 44(Q) that satisfies 2 conditions: (1) the alternate arrangement 44(Q) has a lower DU/DL probability 62(Q) such that the initial DU/DL probability 62(P) exceeds the lower DU/DL probability 62(Q) by at least a predetermined threshold 63 (e.g., by more than 15 percentage points); and (2) the alternate arrangement 44(Q) has a skew 64(Q) below a maximum permitted skew value 65 (e.g., 50%). If at least one such alternate arrangement 44(Q) is found (and rearrangement manager 52 may further attempt to minimize the DU/DL probability 62(Q)), then operation proceeds with sub-step 176. Otherwise operation proceeds with sub-step 178.

In sub-step 176, rearrangement manager 52 directs storage stack 81 to either move data (see sub-step 150) or reassign mappings for future writes (see sub-step 155) according to the alternate arrangement 44(Q) found in either sub-step 170 or 172.

In sub-step 178, since no suitable alternate arrangement 44(Q) was found, no change is made.

Thus, techniques have been presented for minimizing the likelihood of a second drive 42 failing while a first drive 42 is being rebuilt and related problems. In contrast with prior approaches, improved techniques keep track of drive health statistics (e.g., physical state information 54) in order to estimate a likelihood 56 that each drive 42 will fail within a defined period of time. The improved techniques further estimate a probability 62(P) of data unavailability or data loss (DU/DL) based on those likelihoods 56 and a current distribution of data 44(P). If the probability 62(P) is too high and a different distribution 44(Q) would result in a significantly lower probability 62(Q) of DU/DL, then the improved techniques re-arrange the distribution of data in accordance with the different distribution 44(Q).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of maintaining data distributed across a plurality of storage drives (drives) in a robust manner, the method comprising:
   collecting physical state information from each drive of the plurality of drives;
   generating a predicted failure probability of each drive based on the collected physical state information from that drive, the predicted failure probability indicating a likelihood that that drive will fail within a predetermined period of time; and
   rearranging a distribution of data across the plurality of drives to minimize a probability of data unavailability/data loss (DU/DL) by remapping an address space of a logical disk (LUN) so that areas of drives that have lower predicted failure probabilities are configured to store user data and areas of drives that have higher predicted failure probabilities are configured to map to areas of the address space that do not store user data.

2. The method of claim 1, wherein the plurality of drives are arranged in a fixed RAID configuration having a set of stripes, each stripe going across all drives of the plurality of drives; and remapping the address space includes mapping the address space of the LUN to exclude areas of stripes that are on drives that have higher predicted failure probabilities.

3. The method of claim 2 wherein mapping the address space of the LUN to exclude areas of stripes that are on drives that have higher failure probabilities includes moving data already stored on the areas of stripes that are on drives that have higher failure probabilities to areas of stripes that are on drives that have lower failure probabilities.

4. The method of claim 2 wherein mapping the address space of the LUN to exclude areas of stripes that are on drives that have higher failure probabilities includes writing new user data to areas of stripes that are on drives that have lower failure probabilities instead of to areas of stripes that are on drives that have higher failure probabilities.

5. The method of claim 1, wherein the plurality of drives are arranged in a Mapped RAID configuration having a set of stripes, each stripe going across fewer than all of the plurality of drives; and remapping the address space includes mapping the address space of the LUN to exclude areas of stripes that are on drives that have higher predicted failure probabilities.

6. The method of claim 1,
wherein the plurality of drives are arranged in a Mapped RAID configuration having a set of stripes, each stripe going across fewer than all of the plurality of drives; and
wherein rearranging the distribution of data includes rearranging the set of stripes so that areas of stripes that are initially on drives that have higher predicted failure probabilities are moved to drives that have lower predicted failure probabilities.

7. The method of claim 1 wherein rearranging the distribution of data includes:
determining a current probability of DU/DL;
searching a space of different distributions of data across the plurality of drives for a distribution of data that has a lowest probability of DU/DL; and
in response to determining that the current probability of DU/DL exceeds the lowest probability of DU/DL by at least a predetermined threshold, moving data in accordance with the distribution of data that has the lowest probability of DU/DL.

8. The method of claim 1 wherein rearranging the distribution of data includes:
determining a current probability of DU/DL;
searching a space of different distributions of data across the plurality of drives for an alternate distribution of data that satisfies the following conditions:
the alternate distribution has a lower probability of DU/DL such that the current probability of DU/DL exceeds the lower probability of DU/DL by at least a predetermined threshold and
the alternate distribution has a skew below a maximum permitted skew value; and
moving data in accordance with the alternate distribution of data.

9. A computer program product comprising a non-transitory computer-readable storage medium storing a set of instructions, which, when performed by a computing device, cause the computing device to maintain data distributed across a plurality of storage drives (drives) in a robust manner by:
collecting physical state information from each drive of the plurality of drives; generating a predicted failure probability of each drive based on the collected physical state information from that drive, the predicted failure probability indicating a likelihood that that drive will fail within a predetermined period of time; and
rearranging a distribution of data across the plurality of drives to minimize a probability of data unavailability/data loss (DU/DL) by remapping an address space of a logical disk (LUN) so that areas of drives that have lower predicted failure probabilities are configured to store user data and areas of drives that have higher predicted failure probabilities are configured to map to areas of the address space that do not store user data.

10. The computer program product of claim 9,
wherein the plurality of drives are arranged in a Mapped RAID configuration having a set of stripes, each stripe going across fewer than all of the plurality of drives; and
wherein rearranging the distribution of data includes rearranging the set of stripes so that areas of stripes that are initially on drives that have higher predicted failure probabilities are moved to drives that have lower predicted failure probabilities.

11. A data storage system (DSS) comprising:
a plurality of storage drives (drives);
a set of persistent storage device that provide a pool of persistent storage; and
a computing device communicatively-connected to the set of persistent storage devices, the computing device being configured to maintain data distributed across the plurality of drives in a robust manner by:
collecting physical state information from each drive of the plurality of drives;
generating a predicted failure probability of each drive based on the collected physical state information from that drive, the predicted failure probability indicating a likelihood that that drive will fail within a predetermined period of time; and
rearranging a distribution of data across the plurality of drives to minimize a probability of data unavailability/data loss (DU/DL) by remapping an address space of a logical disk (LUN) so that areas of drives that have lower predicted failure probabilities are configured to store user data and areas of drives that have higher predicted failure probabilities are configured to map to areas of the address space that do not store user data.

12. The DSS of claim 11,
wherein the plurality of drives are arranged in a Mapped RAID configuration having a set of stripes, each stripe going across fewer than all of the plurality of drives; and
wherein rearranging the distribution of data includes rearranging the set of stripes so that areas of stripes that are initially on drives that have higher predicted failure probabilities are moved to drives that have lower predicted failure probabilities.

* * * * *